Nov. 30, 1971  H. R. DOANE  3,623,258
DEVICE FOR RETRIEVING LURES
Filed Nov. 7, 1969
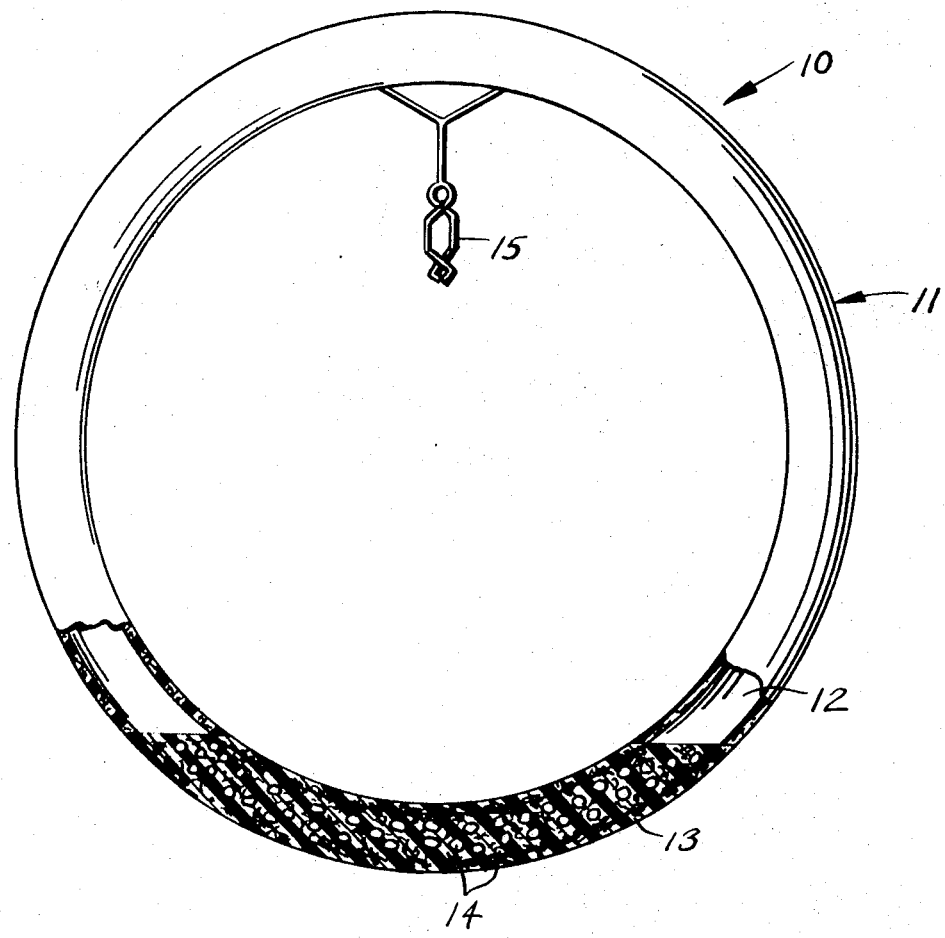
INVENTOR.
*Harold R. Doane*

3,623,258
DEVICE FOR RETRIEVING LURES
Harold R. Doane, 1730 Franklin,
Astoria, Oreg. 97103
Filed Nov. 7, 1969, Ser. No. 874,900
Int. Cl. A01k 97/00
U.S. Cl. 43—17.2                           1 Claim

ABSTRACT OF THE DISCLOSURE

A circular device having an upper portion and a lead weighted pellet lower portion, the upper portion having a spring clip for securing the device to the fishing line in order that it may descend to the snagged lure or hook. By manipulation of the line by the fisherman the spring clip portion of the device serves to dislodge the lure that is snagged on the bottom.

---

This invention relates to retrieving devices, and more particularly to allure and fishhook retriever.

It is therefore the main purpose of this invention to provide a device for retrieving lures and the like.

Another object of this invention is to provide a device for retrieving lures which will be circular in configuration and will have an upper portion of woven polypropylene fibre, the lower portion of the device consisting of woven nylon fibres having lead pellets to cause that portion of the device to be heavy.

A further object of this invention is to provide a device of the described type which will have clip means for guiding the device down to the lure, the clip dislodging the lure.

Other objects of the present invention are to provide a device for retrieving lures which is simple in design, foldable and pocket size, inexpensive to manufacture, rugged in construction, easy to use and efficient in operation.

These and other objects will become readily evident upon a study of the following specification and the accompanying drawing wherein:

The drawing is the sole view of the present invention which is shown partly broken away.

According to this invention, a device 10 for retrieving lures includes a woven polypropylene fibre ring 11 extending as far as 12 except for the lower portion 13 which is of woven nylon fibres having lead pellets throughout.

Opposite of the lower portion 13 is a zinc coated spring clip 15 which when placed upon the fishing line is free to move along the fishing line.

When this device is unfolded it is passed over the butt and reel of the rod and the clip 15 is open to encompass the line ahead of the rod thus allowing the ring 11 to slide free towards the water. Prior to passing ring 11 over the reel and rod the fisherman clicks the spinning wheel into neutral or free-wheeling position. After the ring 11 travels towards the water the fisherman next clicks the spinning reel transmission into wind-in drive and through manipulation of the fishing pole with a forward cast and a backward motion, the snagged lure is dislodged and the fisherman retrieves the lure.

The lead weighted portion 13 of device 10 produces a diving motion of device 10 as it proceeds through a flowing stream of water. A slight lofting of the fishing pole tip allows device 10 to move rapidly through slower flowing water to the snagged lure area. At the discretion of the fisherman, the diving motion of the ring device 10 may be increased with an additional application of a small amount of finger lead wire wound around the lower portion 13.

It shall be noted that the spring clip 15 guides device 10 to the snagged lure. As the clip 15 strikes the rear of the lure, the barbed hooks of the lure become dislodged and the lure may then be reeled in.

The upper portion of ring 11 serves to impart some buoyancy to the action and assures a safe wind-in.

What I now claim is:

1. A device for retrieving lures, comprising in combination, a woven plastic fiber ring, a weighted lower portion of said ring providing means for causing said device to descend into the water towards a lure that is snagged, a spring clip carried by said ring providing a means for forcibly unsnagging the lure from the bottom of a stream, said spring clip being secured by line means and positioned within the central opening formed by said ring, said clip being located near an upper portion of said ring opening, said spring clip providing a means for freely engaging a fisherman's line so that said device will be guided down to said snagged lure, and an action of said clip against a rear of said lure providing a means for dislodging said lure in order that it may be retrieved, said weighted lower portion of said ring consisting of lead pellets woven into nylon fibers thus providing the necessary weight for descending said ring, an upper portion of said ring providing a lifting motion when retrieving said lure by its inherent bouyancy, said device in use being placed over the butt of a fisherman's fishing pole and over a reel and tip of said fishing pole in order that said spring clip will guide said device down to said snagged lure.

References Cited
UNITED STATES PATENTS
3,531,887  10/1970  Bortle _____ 43—17.2
2,641,078  6/1953  Geavien _____ 43—5

FOREIGN PATENTS
1,128,638  9/1968  Great Britain.

WARNER H. CAMP, Primary Examiner